US011333766B2

United States Patent
Kozak et al.

(10) Patent No.: US 11,333,766 B2
(45) Date of Patent: May 17, 2022

(54) METHOD FOR ASSISTING A DRIVER OF A VEHICLE/TRAILER COMBINATION IN MANEUVERING WITH THE VEHICLE/TRAILER COMBINATION, BLIND SPOT SYSTEM AS WELL AS VEHICLE/TRAILER COMBINATION

(71) Applicant: VALEO Schalter und Sensoren GmbH, Bietigheim-Bissingen (DE)

(72) Inventors: Ondrej Kozak, Prague (CZ); Petr Krejci, Prague (CZ); Yaron Sela, Prague (CZ); Pavel Zednik, Prague (CZ)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 956 days.

(21) Appl. No.: 16/003,220

(22) Filed: Jun. 8, 2018

(65) Prior Publication Data
US 2018/0356527 A1  Dec. 13, 2018

(30) Foreign Application Priority Data

Jun. 9, 2017 (DE) .................... 102017112785.2

(51) Int. Cl.
*G01S 17/931* (2020.01)
*G01S 7/48* (2006.01)
(Continued)

(52) U.S. Cl.
CPC .......... *G01S 17/931* (2020.01); *G01S 7/4802* (2013.01); *G01S 7/486* (2013.01); *G01S 7/4808* (2013.01); *G08G 1/167* (2013.01)

(58) Field of Classification Search
CPC ...... G01S 7/486; G01S 7/4802; G01S 7/4808; G01S 17/931; G08G 1/167
See application file for complete search history.

(56) References Cited

U.S. PATENT DOCUMENTS 9,211,889 B1  12/2015  Hoetzer et al.
9,335,162 B2   5/2016  Kyrtsos et al.
(Continued)

FOREIGN PATENT DOCUMENTS

DE  102005044485 A1  4/2007
DE  102010048144 A1  7/2011
(Continued)

OTHER PUBLICATIONS

Lim, Gek; Bezdek, James C.: "Small Targets in LADAR Images Using Fuzzy Clustering" In: 1998 IEEE International Conference on Fuzzy Systems Proceedings, IEEE World Congress on Computational Intelligence, vol. 1, 1998, S. 61-66.—DOI: 10.1109/Fuzzy.1998.687459 (3 pages).

(Continued)

*Primary Examiner* — Luke D Ratcliffe
(74) *Attorney, Agent, or Firm* — Osha Bergman Watanabe & Burton LLP (57) ABSTRACT

The invention relates to a method for assisting a driver of a vehicle/trailer combination (1) formed by a towing vehicle (2) and a trailer (3) during maneuvering with the vehicle/trailer combination (1), wherein lidar sensor data of a lidar sensor device (6) of the towing vehicle (2) are received from an environmental region (5) of the vehicle/trailer combination (1), detection points (9) corresponding to the trailer (3) are identified in the lidar sensor data and a blind spot region (8) for the trailer (3) is defined as a function of the detection points (9) corresponding to the trailer (3), wherein a kinematic model (17) describing the trailer (3) is preset, at least one model sub-region at least partially overlapping the kinematic model (17) is determined, the detection points (9) located within the model sub-region are classified as detection points (9) corresponding to the trailer (3), the kinematic model (17) of the trailer (3) is updated based on the detection (Continued)

points (9) corresponding with the trailer (3) and the blind spot region (8) for the trailer (3) is updated in dependence on the updated kinematic model (17) of the trailer (3). The invention moreover relates to a blind spot system (4) as well as to a vehicle/trailer combination (1).

20 Claims, 4 Drawing Sheets

(51) Int. Cl.
*G01S 7/486* (2020.01)
*G08G 1/16* (2006.01)

(56) References Cited

U.S. PATENT DOCUMENTS

| | | | |
|---|---|---|---|
| 10,112,646 B2* | 10/2018 | Lavoie | B62D 15/029 |
| 2008/0186204 A1* | 8/2008 | Buckley | G08G 1/167 |
| | | | 340/901 |
| 2011/0181457 A1 | 7/2011 | Basten | |
| 2014/0085472 A1* | 3/2014 | Lu | B60R 1/002 |
| | | | 348/148 |
| 2014/0160276 A1* | 6/2014 | Pliefke | B62D 13/06 |
| | | | 348/118 |
| 2014/0232566 A1* | 8/2014 | Mimeault | G01S 7/4802 |
| | | | 340/935 |
| 2017/0363727 A1* | 12/2017 | Prasad | G08G 1/167 |
| 2019/0084477 A1* | 3/2019 | Gomez-Mendoza | B62D 13/06 |

FOREIGN PATENT DOCUMENTS

| | | |
|---|---|---|
| DE | 102010018038 A1 | 10/2011 |
| DE | 112015002788 T5 | 3/2017 |
| DE | 102015117903 A1 | 4/2017 |
| DE | 102015224362 A1 | 6/2017 |
| EP | 2983006 A1 | 2/2016 |
| EP | 3070492 A1 | 9/2016 |

OTHER PUBLICATIONS

German Search Report issued in corresponding German Application No. 102017112785.2, dated Jan. 29, 2018 (8 pages).

European Search Report issued in corresponding European Application No. 18175947.3, dated Nov. 6, 2018 (7 pages).

* cited by examiner

METHOD FOR ASSISTING A DRIVER OF A VEHICLE/TRAILER COMBINATION IN MANEUVERING WITH THE VEHICLE/TRAILER COMBINATION, BLIND SPOT SYSTEM AS WELL AS VEHICLE/TRAILER COMBINATION

The invention relates to a method for assisting a driver of a vehicle/trailer combination formed by a towing vehicle and a trailer during maneuvering with the vehicle/trailer combination, in which lidar sensor data of a lidar sensor device of the towing vehicle are received from an environmental region of the vehicle/trailer combination, detection points corresponding to the trailer are identified within the lidar sensor data and a blind spot region for the trailer is defined as a function of the detection points corresponding to the trailer. The invention also relates to a blind spot system as well as a vehicle/trailer combination.

Blind spot systems for motor vehicles are already known from the prior art. Therein, a partial area in an environmental region of the motor vehicle, a so-called blind spot, which is poorly or hardly visible to the driver, is monitored by a sensor device of the motor vehicle. If an object, for example another vehicle or a cyclist, is located in the blind spot, a warning signal can be generated for the driver of the motor vehicle. For example, such blind spot systems can have a radar sensor, which is arranged in a rear bumper of the motor vehicle. In this case, however, the blind spot system cannot be operated if a trailer is coupled to the motor vehicle since the trailer obscures the radar sensor.

US 2011/0181457 A1 describes a vehicle length sensor for determining a length of a vehicle with a variable length, for example a truck. Such a vehicle length sensor can, for example, have a lidar sensor. The vehicle length sensor can, for example, provide a blind spot warning by issuing an indication to a driver of the variable length vehicle when there is a different vehicle beside the vehicle with the variable length at a distance over the length of the vehicle. In this case, the warning range is thus merely adapted to the length of the vehicle, for example the length of the truck.

It is the object of the present invention to provide a particularly reliable blind spot system for a vehicle/trailer combination comprising a towing vehicle and a trailer.

According to the invention, this object is solved by a method, by a blind spot system as well as by a vehicle/trailer combination with the features according to the respective independent patent claims. Advantageous embodiments of the invention are the subject of the dependent patent claims, the description and the figures.

According to one embodiment of a method for assisting a driver of a vehicle/trailer combination formed by a towing vehicle and a trailer during maneuvering with the vehicle/trailer combination, in particular, lidar sensor data of a lidar sensor device of the towing vehicle are received from an environmental region of vehicle/trailer combination, detection points corresponding to the trailer are identified within the lidar sensor data and a blind spot region for the trailer is defined as a function of the detection points corresponding to the trailer. In particular, a kinematic model describing the trailer is preset, at least one model sub-region at least partially overlapping with the kinematic model is determined and the detection points located within the model sub-region are classified as detection points corresponding to the trailer. The kinematic model of the trailer can be updated based on the detection points corresponding to the trailer and the blind spot region for the trailer can be updated according to the updated kinematic model of the trailer.

According to a particularly preferred embodiment of a method for assisting a driver of a vehicle/trailer combination formed by a towing vehicle and a trailer during maneuvering with the vehicle/trailer combination, lidar sensor data of a lidar sensor device of the towing vehicle are received from an environmental region of vehicle/trailer combination, detection points corresponding to the trailer are identified within the lidar sensor data and a blind spot region for the trailer is defined as a function of the detection points corresponding to the trailer. Moreover, a kinematic model describing the trailer is preset, at least one model sub-region at least partially overlapping with the kinematic model is determined and the detection points located within the model sub-region are classified as detection points corresponding to the trailer. The kinematic model of the trailer is updated based on the detection points corresponding to the trailer and the blind spot region for the trailer is updated according to the updated kinematic model of the trailer.

By means of the method, for example, a driver assistance system can be implemented in the form of a blind spot system which can warn the driver of the vehicle/trailer combination when objects, for example other vehicles or cyclists, are in a blind spot of the vehicle/trailer combination. This blind spot represents a sub-region which is poorly or hardly visible to the driver in the environmental region of the vehicle/trailer combination. The vehicle/trailer combination can, for example, comprise a motor vehicle in the form of a passenger car as well as a trailer, for example a caravan or a horse trailer. Also the vehicle/trailer combination can be a truck/trailer combination with a truck and at least one trailer or a semi-trailer truck with a tractor and a semitrailer. The blind spot region of the trailer is in particular dependent on a current position of the trailer with respect to the towing vehicle as well as a geometry of the trailer. The position and the geometry of the trailer are defined by the kinematic model of the trailer.

In order to define the blind spot region of the trailer which represents the blind spot in the environmental region of the trailer, the lidar sensor data are received by the lidar sensor device of the towing vehicle. The lidar sensor device is arranged, in particular, on a side region of the towing vehicle, for example on a side mirror of the towing vehicle, the trailer being at least temporarily at least partially located in a detection region of the lidar sensor device. This means that the trailer does not have to be permanently in the detection region of the lidar sensor device or must be permanently detectable. For example, the trailer can be located in the detection region of the lidar sensor device only during a turning maneuver of the vehicle/trailer combination, in which the trailer is pivoted relative to the towing vehicle. For detecting the trailer, the lidar sensor device can emit light pulses in the direction of the trailer and receive the light pulses at least partially reflected on the trailer as the lidar sensor data. The reflected light pulse can be received in a plurality of light beams, for example in sixteen light beams. Each light beam is a partial area of the reflected light pulse. In order to receive the light beams of the reflected light pulse, the lidar sensor device, which is embodied for example as a solid-state lidar sensor device, can comprise a receiving device with a plurality of receiving elements, for example with sixteen receiving elements. The receiving elements can, for example, comprise photodetectors in the form of light-sensitive semiconductor components, for example photodiodes. The receiving elements can, for example, be arranged in a matrix, i.e. column-wise and/or line-wise. A reflection direction or a reflection angle can be assigned to each receiving element so that a receiving element receives, in particular, only those light beams which fall onto the lidar sensor device from the reflection direction associated with the receiving element.

A light beam describes a course of the intensity of the reflected light, i.e. the distribution of the intensity values over time. This course can be searched for intensity peaks, which can be identified as maximum values of the intensity in the course. These intensity peaks represent the detection points or detections, so-called echoes, which correspond to reflection points in the environmental region. Such a reflection point may, for example, be a point on a side wall of the trailer. Position values for the detection points can be determined, which describe, for example, the spatial position of the reflection points relative to the towing vehicle. In order to determine the position values, one distance value and one reflection angle can be determined for the detection points each. The distance value for a detection point can be determined by means of time-of-flight measurements on the basis of a time or time stamp belonging to the detection point within the course. Since, in particular, a reflection direction is assigned to each receiving element, i.e. each receiving element corresponds to a specific reflection angle, the reflection angle can be determined based on the receiving element for the detection point in addition to the distance value.

On the basis of the position values of the detection points relative to the towing vehicle the detection points corresponding to the trailer can be identified. For example, the detection points which have a predetermined position relative to the kinematic model of the trailer are identified by means of the respective position values. For this purpose, the model sub-region can be determined as a function of the kinematic model of the trailer. The model sub-region describes an area relative to the kinematic model of the trailer within which the trailer may be deviated from the kinematic model. The model sub-region thus represents a tolerance range within which detection points, even if they lie outside the kinematic model, are identified as belonging to the trailer. Then, for example, those detection points which lie within the model sub-region are identified, for example by means of the position values of the detection points. These detection points are assumed to correspond to actual reflection points on the surface of the trailer. These detection points corresponding to the trailer can be used for updating the trailer, for example by updating the position of the trailer indicated by the kinematic model when at least a predetermined number of detection points of the trailer is located outside the kinematic model. This may result, for example, from a changed trailer angle with respect to the towing vehicle. The kinematic model of the trailer is thus updated using the lidar sensor data of the lidar sensor device.

The updated kinematic model thus describes a current spatial position of the trailer relative to the towing vehicle as well as a current geometry of the trailer. Based on this updated kinematic model, the blind spot region of the trailer can then be determined. For example, the blind spot region is defined as an area adjacent to the updated kinematic model. By determining the current position and geometry of the trailer by means of the updating of the kinematic model using the lidar sensor data, a size and a position of the blind spot region relative to the trailer can be determined. The blind spot region is thus updated as a function of the updated kinematic model. In other words, the blind spot region is adapted to the updated kinematic model of the trailer. Thus, the blind spot region can also be optimally adapted to the actual trailer. As a result, a particularly reliable blind spot system can be realized which can warn the driver, for example, of objects in the adapted, updated blind spot region.

Particularly preferably, the above-described steps are performed during respective update cycles for updating the blind spot region of the trailer, wherein the kinematic model updated during an update cycle as well as the blind spot region updated during an update cycle are preset for a subsequent update cycle for re-updating the kinematic model as well as the blind spot region. The return of the updated kinematic model as well as the updated blind spot region to a further update cycle corresponds to a feedback. This results in the advantage that the kinematic model as well as the blind spot region of the trailer can be continuously updated as a function of the lidar sensor data and can be used to determine a new kinematic model as well as a new blind spot region. A blind spot region adapted to the current position and geometry of the trailer can thus be continuously determined with high accuracy.

A first-time presence of the trailer on the towing vehicle is recognized by means of lidar sensor data, wherein a kinematic initial model of the trailer is determined by means of the detection points corresponding to the trailer and an initial blind spot region of the trailer is determined on the basis of the kinematic initial model in an initialization cycle, and wherein the initial blind spot region and the kinematic initial model of the trailer are preset for an update cycle following the initialization cycle. Here, the presence or attendance of the trailer, which has been attached to the towing vehicle, for example, by the driver prior to the start of the towing vehicle and thus before the detection of the lidar sensor data, is detected for the first time. In this case, there is in particular no kinematic model of the trailer that can be updated.

Therefore, the kinematic initial model is created for the first time in the initialization cycle on the basis of the detection points of the lidar sensor data. In this case, for example, a frame enclosing the detection points corresponding to the trailer can be determined. For this purpose, those detection points which are likely to belong to the trailer can be identified based on the position values of the detection points. For example, those detection points are identified on the basis of the respective position values, which are located in a certain distance range behind the towing vehicle. These detection points can be clustered. For the cluster, an enveloping frame or envelope, for example with a rectangular shape, can be determined. This enveloping frame can then be given as a kinematic initial model of the trailer. Based on this initial model, the initial blind spot region is then determined. The kinematic initial model as well as the initial blind spot region are specified for further updating cycles in which the current position as well as the current geometry of the trailer are determined based on the kinematic model of the trailer.

In a further development of the invention, at least one line fit is determined by means of the detection points corresponding to the trailer of the at least one model sub-region, which characterizes a wall region of the trailer. Based on the at least one line fit, at least one feature of the trailer is determined and the kinematic model is updated based on a comparison of the at least one feature with the kinematic model. The at least one feature of the trailer is, in particular, a section of a contour or an outline of the trailer. For this purpose it can be provided that the at least one model sub-region is at least one model region through which an edge of the kinematic model characterizing a wall of the trailer is framed. In particular, a position of the model region and thus the edge to be framed are determined as a function of a mounting location of the lidar sensor device on the towing vehicle.

The trailer can, for example, have a rectangular contour and two opposing side walls extending along a longitudinal axis of the trailer, a front side or a front wall and a back side or a rear wall. In the kinematic model, the trailer may be shown in the form of a rectangle, the side walls, the front wall and the rear wall being shown as respective edges. One of the edges is now framed in particular by the model sub-region. The model region can thus comprise the edge itself as well as regions adjoining the edge. Multiple model sub-regions can also be determined, each model sub-region being formed in particular by a model region framing one of the edges. In particular, those edges are framed by the model regions, which correspond to a wall of the trailer lying in the detection region of the lidar sensor device. In a lidar sensor device arranged in a right side mirror of the towing vehicle, for example, the front edge and a right side edge of the model are framed by the model region.

In addition, the line fit is determined by means of the detection points corresponding to the trailer, for example, by curve fitting, in particular by iterative curve fitting. By the iterative adjustment of the compensation line, i.e. the iterative curve fitting, those detection points within the model sub-region can be identified which are not consistent with the compensation line or cannot be mapped by the line fit. These detection points can be identified as not belonging to the trailer and can be removed. Also, the model sub-region can be adaptively increased, for example, by means of detection points which are outside the predetermined model sub-region but are consistent with the determined compensation line or are mapped by the line fit.

On the basis of the at least one line fit which, for example, represents a wall of the trailer, the at least one feature of the trailer can be determined. In particular, for at least two model sub-regions, for example for the model sub-region framing the right edge and the model sub-region framing the front edge, the line fits are determined. As the feature of the trailer, an L-shaped line can thus be determined. The L-shaped line, for example, represents an area of the front wall and the right side wall of the trailer. This feature is now compared with the kinematic model. In the case of a deviation between the kinematic model and the at least one feature, the kinematic model is updated. The deviation can result, for example, from the changed trailer angle with respect to the towing vehicle. Based on the deviation, the new trailer angle for the kinematic model can, for example, be determined and stored in the updated kinematic model. The kinematic model can thus be updated as a function of the deviation between the non-updated kinematic model and the at least one feature. The at least one feature, in particular, is updated continuously on the basis of the updated kinematic model.

It proves to be advantageous if the kinematic model is determined as a function of a geometric model of the trailer comprising at least one geometrical parameter and at least one kinematic parameter. For updating the kinematic model, in particular, the geometric model and/or the at least one kinematic parameter is updated based on the comparison between the detection points corresponding to the trailer and the kinematic model. By the at least one kinematic parameter in the kinematic model, a current position as well as a movement of the trailer with respect to the towing vehicle can be described. As the at least one kinematic parameter, for example, a trailer angle between trailer and towing vehicle and/or a change in the trailer angle and/or a wheelbase of the trailer can be determined and updated based on the comparison of the at least one feature and the kinematic model. In order to determine the trailer angle or the change in the trailer angle, for example, the line fit which describes the wall region of the trailer can be compared with that edge of the kinematic model which corresponds to the wall region of the trailer. An angle of the line fit can be inputted into the kinematic model, which then estimates the trailer angle as well as a rate of change of the trailer angle. A position of the blind spot region relative to the towing vehicle or relative to the trailer can be adapted to the current kinematic parameter, for example, to the current trailer angle. This means, for example, that the blind spot region can be pivoted together with the trailer.

The geometric model in the kinematic model can be used to describe a shape or a geometry as well as a construction of the trailer. The geometric model can be determined and updated separately from the at least one kinematic parameter, for example by means of the feature extraction of the at least one feature of the trailer on the basis of the lidar sensor data. For example, as the at least one geometric parameter, a geometrical dimension of the trailer and/or a length of a trailer coupling and/or a position of at least one pivot point of the trailer and/or a type of a coupling device of the trailer for attaching to the towing vehicle is determined, and updated based on the comparison of the at least one feature and the kinematic model. As the at least one geometrical dimension, a length and/or a width of the trailer can be determined, for example. The position of the pivot point can be determined as a position of a front corner of the trailer. This corner can be recognized, for example, by means of the at least one feature of the trailer in the form of the L-shaped line. The length of the trailer may, for example, be determined as a length of the line of the L-shaped line representing the side wall of the trailer. The width of the trailer can be determined based on a length of the line of the L-shaped line representing the front-wall.

Furthermore, the type of the coupling device of the trailer, by means of which the trailer is coupled to the towing vehicle, can be determined. In particular, it is determined whether the coupling device is a gooseneck or a drawbar or coupling rod. If, for example, a width of the trailer determined by means of the at least one feature is unrealistic, it can be assumed that the type of the coupling device in the current kinematic model is faulty. The kinematic model is updated in such a way that the type of the coupling device in the current kinematic model is changed to the respective other type of coupling device, i.e. for example, from a regular drawbar to the gooseneck. Based on the updated geometric model and/or the at least one updated kinematic parameter, then the kinematic model of the trailer can be updated so that the blind spot region of the trailer can be updated. For example, geometric dimensions of the blind spot region can be determined as a function of the updated geometric model of the trailer. For example, a length of the blind spot region can be determined as a function of the length of the trailer. For this purpose, the length of the blind spot region can be determined, for example, from the sum of a longitudinal edge in the kinematic model, which represents the side wall of the trailer, and a tolerance length. This means that the blind spot region projects beyond the rear wall of the trailer. The driver is thus also warned, for example, if objects are obliquely behind the trailer.

It may be provided that the kinematic model is additionally determined and updated as a function of the odometry data of the towing vehicle, in particular a speed of the towing vehicle and/or a steering angle of the towing vehicle. For example, the change in the trailer angle between the towing vehicle and the trailer resulting from a change in the steering angle of the towing vehicle can be determined by the odometry data and used to update the kinematic model. On the basis of the odometry data, the data recorded by the lidar sensor device can be advantageously verified or checked. The kinematic model and thus the blind spot region of the trailer are updated, in particular, only on the basis of the lidar sensor data and the odometry data. Thus, in particular, no further sensor data is necessary for updating, and in particular no communication with the trailer is necessary. The update of the kinematic model of the trailer based on odometry data is particularly advantageous when the lidar sensor data do not have any detection points corresponding to the trailer or the lidar sensor data are too noisy.

In a further development of the invention, an additional blind spot region of the towing vehicle is determined as a function of the updated kinematic model of the trailer and/or a combined blind spot region of the trailer comprising the blind spot region of the trailer and a blind spot region of the towing vehicle is determined as a function of the updated kinematic model of the trailer. For example, a position, in particular a lateral distance of the blind spot region of the towing vehicle to the towing vehicle, can be determined as a function of a geometrical dimension of the trailer, for example a width of the trailer, which is stored in the kinematic model. Therein, it can be provided that only the blind spot region of the towing vehicle is predetermined if it is sensed by the lidar sensor data that no trailer is coupled to the towing vehicle. As soon as a trailer is coupled to the towing vehicle, the blind spot region of the trailer can be determined and updated continuously in addition to the blind spot region of the towing vehicle. The blind spot regions of the towing vehicle as well as of the trailer can also be combined to form a common blind spot region of the trailer. The blind spot system is thus adapted to the current configuration of the vehicle/trailer combination which comprises either the towing vehicle alone or the towing vehicle with the coupled trailer.

Particularly preferably, detection points corresponding to a free space in the environmental region are identified in the lidar sensor data based on the kinematic model of the trailer, objects are identified in the environmental region by means of the detection points corresponding to the free space and it is examined if the objects are located within the updated blind spot region of the trailer determined based on the updated kinematic model. Thus, the detection points corresponding to the trailer are separated in the lidar sensor data from the detection points corresponding to the free space. For example, all detection points that lie outside the model sub-regions determined based on the kinematic model can be classified as detection points corresponding to the free space. On the basis of these detection points corresponding to the free space, the objects, for example other vehicles, can be determined in the environmental region of the vehicle/trailer combination. Based on the position values of the detection points belonging to the objects, the spatial position of the objects relative to the updated blind spot region of the trailer can be determined. This makes it possible to check whether the objects are located in the updated blind spot region, and if so, a warning signal is output to the driver of the trailer.

In a particularly advantageous development of the invention, intensity values of the detection points corresponding to the free space are determined, the detection points are filtered by comparing the intensity values with a distance-based intensity threshold, the filtered detection points corresponding to the free space are grouped into clusters, and the objects are recognized based on the clusters. The respective detection points within a cluster are filtered by comparing the intensity values of the detection points within the cluster with a cluster-specific relative intensity threshold, the cluster-specific relative intensity threshold being determined as a function of the intensity values of the detection points of the cluster.

The detection points corresponding to the free space are firstly filtered based on their absolute intensity. For this purpose, the intensity values of at least some detection points, in particular of each detection point, can be compared with the predetermined distance-based intensity threshold. The distance-based intensity threshold is thus an intensity threshold which is variable as a function of the distance and which is compared with al the detection points within a specific distance range. The detection points within a distance range are thus compared with the assigned intensity threshold and are thus filtered within the distance range based on their absolute intensity. All detection points are filtered out or removed, whose intensity value is below the distance-based intensity threshold. The distance-based intensity threshold is in particular predetermined in such a way that interference signals, for example a sensor noise or unwanted detections, can be suppressed. As unwanted detections, those detection points are filtered out, which correspond to undesirable reflections in the environmental region. Such unwanted reflections can be caused, for example, by splash water or water vapor. A minimum intensity value required for the detection points for preventing out-filtering can be described by a curve in which the distance-based intensity threshold decreases with increasing distance of a detection point. In other words, the lower the distance, the higher the distance-based intensity threshold. The closer a detection point, the higher must be its intensity value so as not to be filtered out.

Subsequently, the detection points are grouped into clusters or point clouds. As a cluster, a collection of detection points is interpreted, whose corresponding reflection points originate from the same object in the environmental region. In other words, it is assumed that each cluster represents an object in the environmental region. For example, the detection points can be grouped to the clusters by density-based spatial cluster analysis, in particular by DBSCAN ("density-based spatial clustering of applications with noise").

After the grouping of the detection points into clusters, the detection points within a cluster, i.e. the cluster candidates are filtered based on their relative intensity. For this purpose, the intensity values of the individual cluster candidates are compared with the cluster-specific, relative intensity threshold. For example, a weighted mean value of the intensity values of the respective detection points within a cluster can be given as the cluster-specific relative intensity threshold, wherein a configurable parameter between 0 and 1 can be given for weighting the mean value. The cluster-specific relative intensity threshold is thus determined from the weighted average intensity of at least some, in particular all, detection points within the cluster. Then, in particular, each detection point within the cluster is compared with the weighted average intensity and filtered out if its intensity value is less than the weighted mean value. It can also be provided that the detection points corresponding to the trailer are filtered before the determination of the at least one feature of the trailer, for example, before determining the line fit, based on its absolute and its relative intensities.

By filtering the detection points within a cluster, detection points can be eliminated in the cluster whose intensity values, for example due to a crosstalk of neighboring detection points with a high intensity value of the reflected light, are faulty. Based on the filtered clusters, the objects can then be correctly recognized and in particular a size and a shape of the objects can be determined with a high accuracy.

A spatial position of the identified objects to the updated kinematic model of the trailer is preferably determined on the basis of the lidar sensory data, and a presence of an object in the updated blind spot region is detected if an overlapping region between the object and the updated blind spot region exceeds a predetermined threshold value for the overlapping region, wherein a warning signal is generated in case of the presence of an object in the updated blind spot region. In particular, a time period of the presence of the object in the blind spot region is detected and the warning signal is generated only if the time period exceeds a predetermined threshold value for the time period. The threshold value for the overlapping area can be, for example, 60%. The threshold value for the time period can be, for example, 250 ms. As the spatial position of the object relative to the trailer, for example, a lateral as well as a longitudinal distance of the respective object from the trailer, for example, a right rear corner of the trailer, can be determined. From this clearance of the object to the trailer, it can then be determined whether and to which extent the trailer is located in the blind spot region.

Thus, if the object is located at least over the predetermined time period predominantly in the blind spot region, for example the blind spot region of the trailer or the blind spot region of the towing vehicle or the blind spot region of the vehicle/trailer combination, a blind spot flag is set. Based on this blind spot flag, the warning signal is generated. The warning signal may, for example, be an acoustic warning signal in the form of a warning sound. It can also be provided that the warning signal is a visual warning signal which is displayed on a vehicle-mounted display device, for example on a screen in a passenger compartment of the towing vehicle.

It proves to be advantageous if a specific warning signal is generated for each blind spot region in the event that a blind spot region for the trailer, a blind spot region for the towing vehicle and a blind spot region for the vehicle/trailer combination are determined. In other words, one of the blind spot flags is determined for each blind spot region. If it is detected based on one of the blind spot flags that an object is located in the blind spot region corresponding to the blind spot flag, a region-specific warning signal can be generated. For example, the blind spot regions can be displayed on the vehicle-side display device, wherein the blind spot region is highlighted, for example colored, in which the object is located. On the basis of the region-specific warning signal, the driver of the vehicle/trailer combination can advantageously recognize particularly quickly where the object is located in the environmental region area of the vehicle/trailer combination.

The invention also relates to a blind spot system for a vehicle/trailer combination formed by a towing vehicle and a trailer, comprising at least one lidar sensor device for positioning on the towing vehicle and for detecting lidar sensor data from an environmental region of the vehicle/trailer combination, and a control device which is configured to perform a method according to the invention or an advantageous embodiment thereof. The blind spot system is in particular designed to warn the driver if objects are located in the blind spot of the vehicle/trailer combination and, as a result, there is a danger for the driver or the object, for example, when changing the lane or when turning. In order to output a warning signal, the driver assistance system can have an output device, for example a screen or a loudspeaker.

A vehicle/trailer combination according to the invention comprises a towing vehicle, a trailer coupled to the towing vehicle, and a blind spot system according to the invention. The towing vehicle can be designed, for example, as a motor vehicle, a truck or a motorcycle. The towing vehicle can, for example, have a trailer coupling for attaching the trailer via a drawbar or a coupling rod. The towing vehicle can also have, for example, a loading surface by means of which the trailer can be coupled by means of a so-called gooseneck. Furthermore, the towing vehicle comprises at least one lidar sensor device, which is arranged in particular on a side area, for example a side mirror.

By indications "left", "right", "front", "rear", etc. positions and orientations from the perspective of an observer looking in the longitudinal direction of the vehicle are indicated.

The preferred embodiments presented with reference to the method according to the invention and their advantages apply accordingly to the blind spot system according to the invention as well as to the vehicle/trailer combination according to the invention.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

The invention is explained in more detail on the basis of preferred exemplary embodiments and with reference to the attached drawings.

These show in.

In the figures identical as well as functionally identical elements are provided with the same reference characters.

Figure 1:
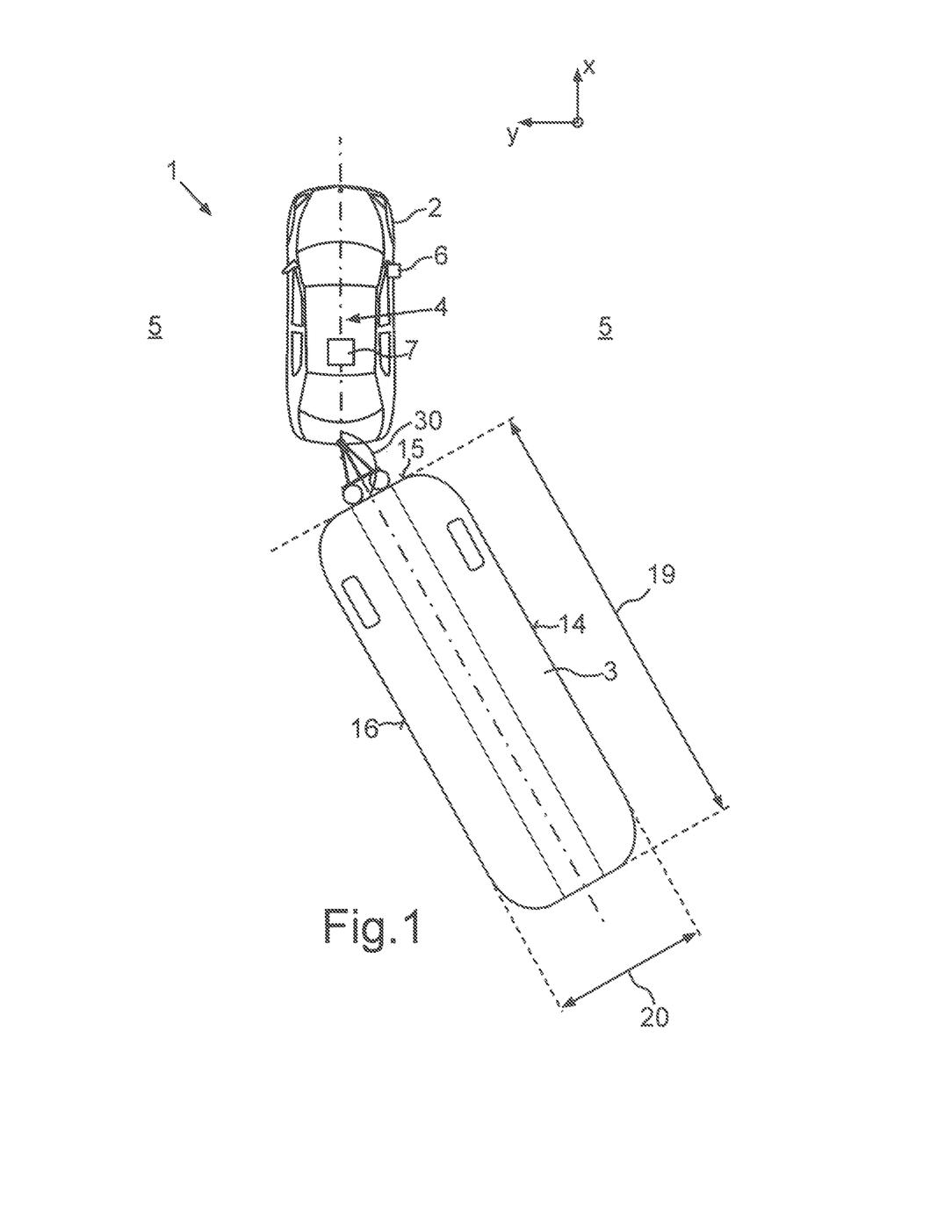
FIG. 1 a schematic representation of an embodiment of a vehicle/trailer combination according to the invention comprising a motor vehicle and a trailer.

FIG. 1 shows a vehicle/trailer combination 1 according to the present invention in a plan view. The vehicle/trailer combination 1 is formed from a towing vehicle 2 and a trailer 3 attached to the towing vehicle 2. Here, the towing vehicle 2 is designed as a motor vehicle in the form of a passenger car. The trailer 3 can, for example, be a caravan or a horse trailer. The vehicle/trailer combination 1 comprises a blind spot system 4 which is designed to assist a driver of the vehicle/trailer combination 1 during maneuvering with the vehicle/trailer combination 1. For this purpose, the blind spot system 4 can warn the driver, for example, if an object is located in a blind spot in the environmental region 5 of the vehicle/trailer combination 1.

In order to monitor the environmental region 5, the blind spot system 4 comprises a lidar sensor device 6, which is arranged here on a right-hand side mirror of the towing vehicle 2 and whose viewing direction is directed towards the rear (negative y-direction) in the direction of the trailer 3. Thus, the trailer 3 is at least partially located in a detection region of the lidar sensor device 6. The lidar sensor data detected by the lidar sensor device 6 from the environmental region 5 of the vehicle/trailer combination 1 can be transmitted to a control device 7 of the blind spot system 4. The control device 7 can determine a blind spot region 8 for the trailer 3, which is shown by way of example in FIG. 3, based on the lidar sensor data.

Figure 2:
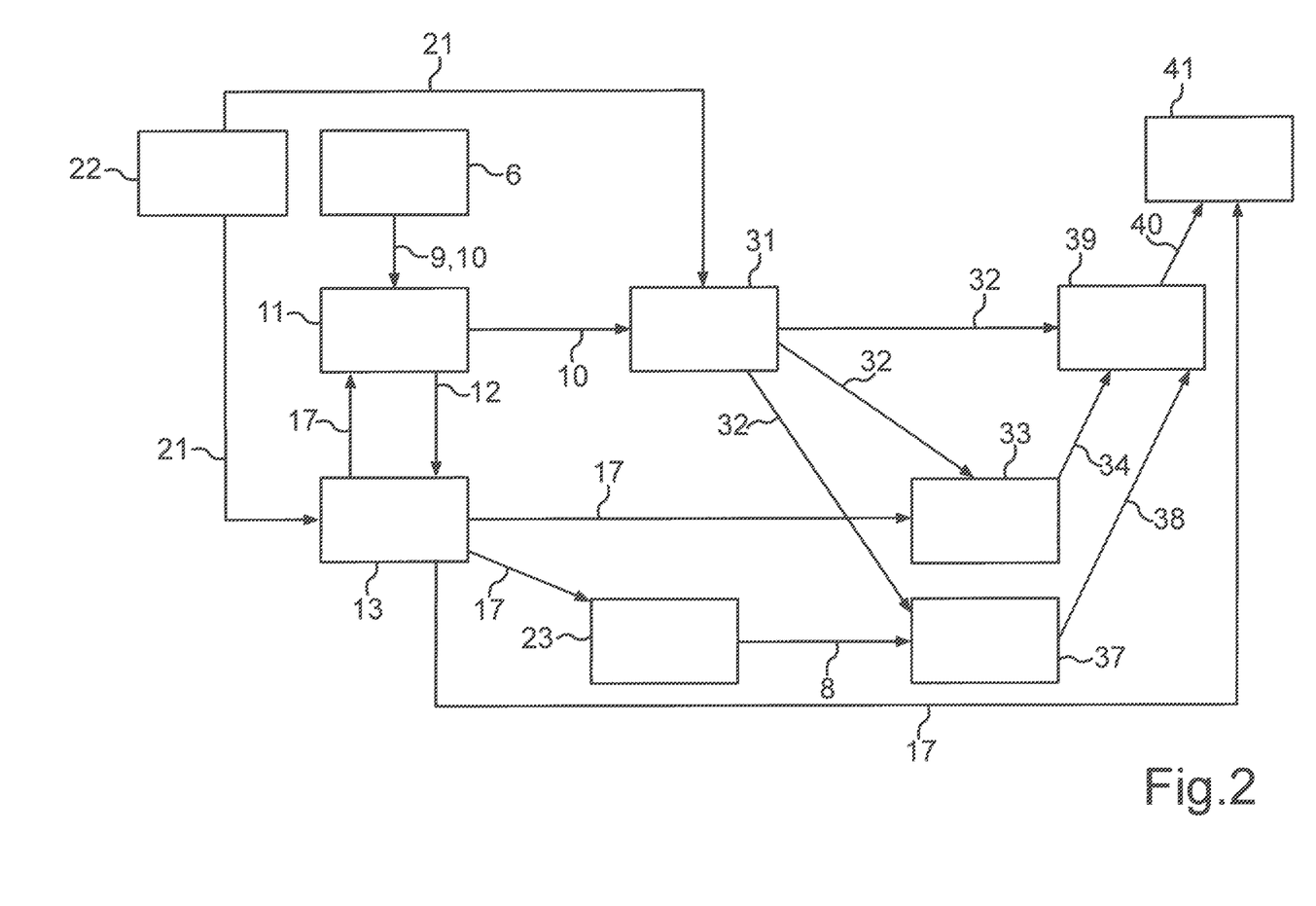
FIG. 2 a schematic representation of a flow chart of an embodiment of a method according to the invention.
Figure 3:
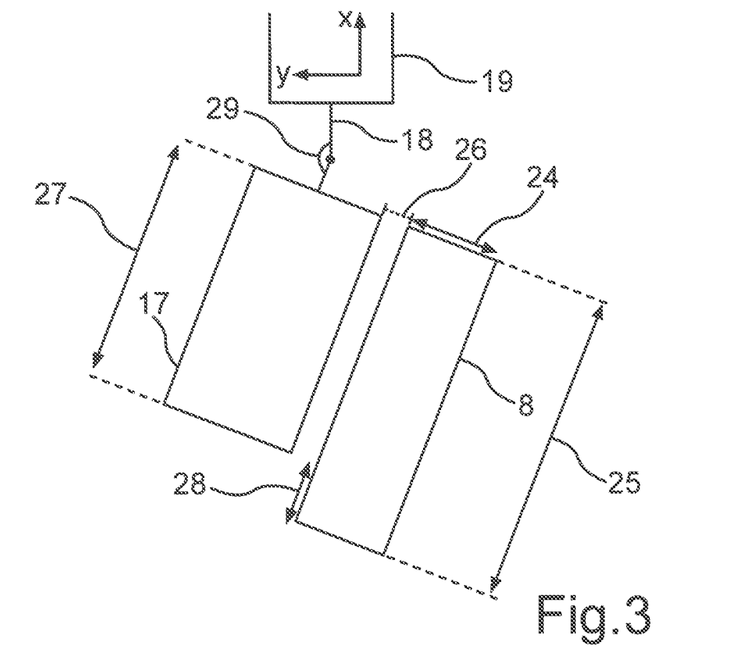
FIG. 3 a schematic representation of a kinematic model of the trailer with a blind spot region.
Figure 4:
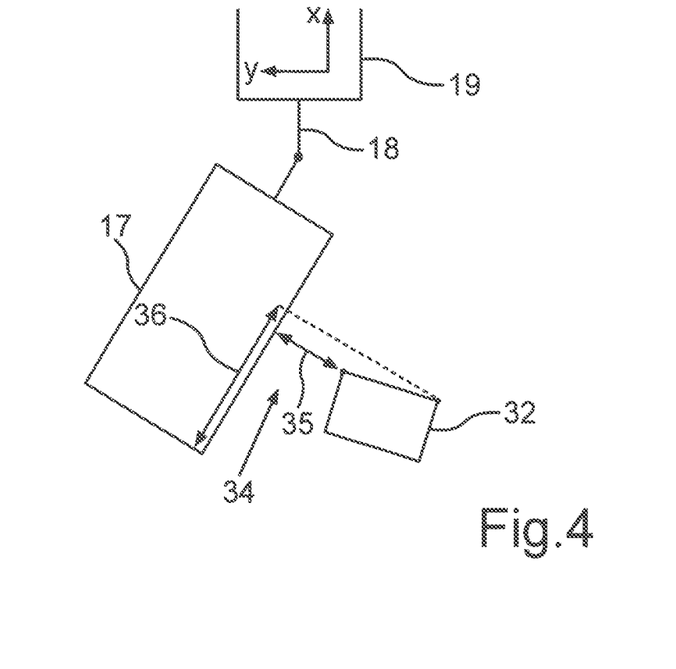
FIG. 4 a schematic representation of a kinematic model of the trailer with an object.

A flowchart for determining the blind spot region 8 is shown with reference to FIG. 2. For this purpose, detection points 9, 10, which are fed to a trailer feature extractor 11, are identified in the lidar sensor data of the lidar sensor device 6 detected from the environmental region 5 of the vehicle/trailer combination 1. The trailer feature extractor 11 separates those detection points 10 corresponding to a free space in the environmental region 5 from the detection points 9 corresponding to the trailer 3. Based on the detection points 9 corresponding to the trailer 3, at least one feature 12 of the trailer 3 can be determined by the trailer feature extractor 11 and fed to a trailer estimator 13. The at least one feature 12 of the trailer 3 represents, for example, areas of walls 14, 15, 16 (see FIG. 1) of the trailer 3. Based on the at least one feature 12 of the trailer 3, the trailer estimator 13 creates a kinematic model 17 of the trailer 3, which describes a current position of the trailer 3 to the towing vehicle 2 as well as a geometry of the trailer 3, for example a length 19 and a width 20 of the trailer 3 (see FIG. 1). Such a kinematic model 17 of the trailer 3 is shown by way of example in FIG. 3 and FIG. 4. The kinematic model 17 of the trailer 3 shown in FIGS. 3 and 4 is coupled to a model 19 of the towing vehicle 2 via a trailer coupling 18.

The kinematic model 17 of the trailer 3 determined by the trailer estimator 13 is returned to the trailer feature extractor 11, which updates the feature 12 of the trailer 3 based on the kinematic model 17 of the trailer 3. This updated feature 12 is, in turn, fed to the trailer estimator 13 which, based on this, updates the kinematic model 17 of the trailer 3, etc. Thus, there is a feedback between the trailer estimator 13 and the trailer feature extractor 11. Odometry data 21 of an odometer 22 of the towing vehicle 2 can also be used to update the kinematic model 17 of the trailer 3. Such odometry data 21 can, for example, be a current speed of the towing vehicle 2 as well as a current steering angle of the towing vehicle 2. The updated kinematic model 17 is also fed to a blind spot region determiner 23 which, based on the updated kinematic model 17, creates the blind spot region 8 of the trailer 3. A width 24 and a length 25 of the blind spot region 8 are created based on the kinematic model 17 of the trailer 3. A distance 26 of the blind spot region 8 to the trailer 3 is also determined using the kinematic model 17. For example, the length 25 of the blind spot region 8 can be determined as the sum of a length 27 of the kinematic model 17, which represents the length 19 of the trailer 3, as well as a tolerance length 28. A position of the blind spot region 8 can, for example, be determined as a function of an angle 29 of the kinematic model 17, which describes a trailer angle 30 of the trailer 3 with respect to the towing vehicle 2.

In addition, the detection points 10 corresponding to the free space are fed to an object tracker 31. The odometry data 21 of the odometer 22 can also be provided to the object tracker 31. The object tracker 31 recognizes and tracks objects 32 corresponding to the free space in the environmental region 5 of the vehicle/trailer combination 1. For example, the detection points 10 corresponding to the free space can be grouped into dusters, each cluster representing an object 32. The tracked objects 32 as well as the updated kinematic model 17 of the trailer 3 can be fed to a clearance determiner 33. The clearance determiner 33 determines a clearance or a spatial position 34 of the objects 32 from the kinematic model 17 of the trailer 3. To determine the spatial position 34, as shown in FIG. 4, a lateral distance 35 as well as a longitudinal distance 36 of the object 32 to the kinematic model 17 of the trailer 3 are determined.

In addition, the tracked objects 32 are fed to a blind spot flag determiner 37, which produces a blind spot flag 38 on the basis of the determined blind spot region 8 as well as the object 32. The blind spot flag determiner 37 checks whether the object 32 is located in the blind spot region 8 on the basis of the object 32 as well as the position 34 of the object 32. A blind spot object determiner 39 can extend the tracked objects 32 with respective blind spot flags 38 as well as clearance information of the objects 32 to the vehicle/trailer combination 1. When, for example, it has been detected that a predetermined minimum proportion of the object 32, for example 60%, is located in the blind spot region 8 over a predetermined minimum time period, for example 250 ms, the object 32 is marked with the blind spot flag 38 and defined as a so-called blind spot object 40. The blind spot object 40 as well as the kinematic model 17 of the trailer 3 can be fed to an output device 41 which then generates a warning signal, for example a warning sound or a visual warning symbol.

Figure 5:
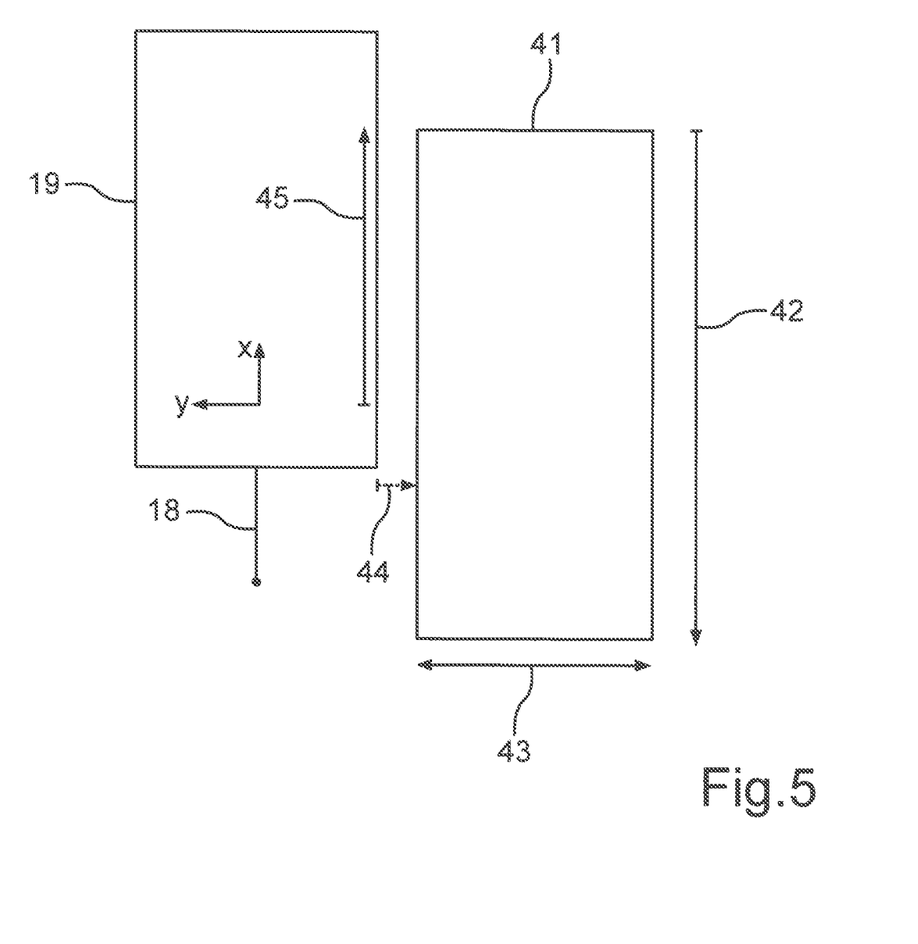
FIG. 5 a schematic representation of a model of the motor vehicle with a blind spot region.

FIG. 5 shows the model 19 of the towing vehicle 2, for which a blind spot region 41 is also determined. The blind spot region 41 of the towing vehicle 2 has a length 42 as well as a width 43, which can be determined, for example, by means of the kinematic model 17 of the trailer 3. A lateral offset 44 as well as a longitudinal offset 45 of the blind spot region 41 with respect to the model 19 of the towing vehicle 2 can also be determined as a function of the kinematic model 17 of the trailer 3. When an object 32 is now located in one of the blind spot regions 8, 41, that is to say in the blind spot region 8 of the trailer 3 or in the blind spot region 41 of the towing vehicle 2, a specific warning signal can be generated which additionally indicates to the driver of the vehicle/trailer combination 1, in which of the blind angle regions 8, 41 the object 32 is located. A combined blind spot region for the vehicle/trailer combination 1 can also be defined by means of the blind spot region 41 of the towing vehicle 2 as well as by means of the blind spot regions 8 of the trailer 3.

The invention claimed is:

1. A method for assisting a driver of a vehicle/trailer combination formed by a towing vehicle and a trailer during maneuvering with the vehicle/trailer combination, the method comprising:

receiving lidar sensor data of a lidar sensor device of the towing vehicle from an environmental region of the vehicle/trailer combination, at least when the trailer is temporarily and partially located in a detection region of the lidar sensor device;

identifying detection points corresponding to the trailer in the received lidar sensor data; and defining a blind spot region for the trailer as a function of the identified detection points corresponding to the trailer, wherein the blind spot region for the trailer is dependent on a current position of the trailer and a geometry of the trailer;

a kinematic model describing the trailer is preset, determining at least one model sub-region at least partially overlapping the kinematic model;

classifying the detection points located within the model sub-region as detection points corresponding to the trailer;

updating the kinematic model of the trailer based on the detection points corresponding with the trailer; and updating the blind spot region for the trailer in dependence on the updated kinematic model of the trailer, wherein the updated blind spot region for the trailer is adapted to a current position of the trailer and the geometry of the trailer.

2. The method according to claim 1, wherein the kinematic model of the trailer as well as the blind spot region are updated during respective update cycles, wherein the kinematic model updated during an update cycle as well as the blind spot region updated during an update cycle are preset for a subsequent update cycle for re-updating the kinematic model and the blind spot region.

3. The method according to claim 1, wherein a first-time presence of the trailer on the towing vehicle is recognized by means of lidar sensor data, wherein a kinematic initial model of the trailer is determined based on the detection points corresponding to the trailer and an initial blind spot region of the trailer is determined on the basis of the kinematic initial model in an initialization cycle, and wherein the initial blind spot region and the kinematic initial model of the trailer are preset for an update cycle following the initialization cycle.

4. The method according to claim 1, wherein at least one line fit is determined based on the detection points corresponding to the trailer of the at least one model sub-region, which characterizes a wall region of the trailer, at least one feature of the trailer is determined based on the at least one line fit and the kinematic model is updated based on a comparison of the at least one feature with the kinematic model.

5. The method according to claim 4, wherein the kinematic model is determined as a function of a geometric model of the trailer comprising at least one geometric parameter and as a function of at least one kinematic parameter, and for updating the kinematic model, the geometric model and/or the at least one kinematic parameter is updated based on the comparison between the detection points corresponding with the trailer and the kinematic model.

6. The method according to claim 5, comprising:
determining the at least one kinematic parameter based on one or more of:
a trailer angle between the trailer and towing vehicle;
a change in the trailer angle; and
a wheelbase of the trailer;
wherein the at least one kinematic parameter is updated via comparing the at least one feature and the kinematic model.

7. The method according to claim 5, comprising:
determining the at least one geometric parameter based on one or more of:
at least one geometrical dimension of the trailer;
a length of a trailer coupling;
a position of at least one pivot point of the trailer; and
a type of coupling device of the trailer for attaching to the towing vehicle;
wherein the at least one geometric parameter is updated via comparing the at least one feature and the kinematic model.

8. The method according to claim 7, wherein, the at least one geometric parameter is determined based on a geometrical dimension of the trailer, including a length and width of the trailer.

9. The method according to claim 5, wherein a position of the blind spot region relative to the towing vehicle and/or relative to the trailer is adapted to a current angle of the trailer with respect to the towing vehicle.

10. The method according to claim 1, wherein the kinematic model is additionally determined and updated as a function of odometry data of the towing vehicle a speed of the towing vehicle and/or a steering angle of the towing vehicle.

11. The method according to claim 1, wherein a blind spot region for the towing vehicle is determined as a function of the updated kinematic model of the trailer and/or a combined blind spot region of the vehicle/trailer combination comprising the blind spot region of the trailer and a blind spot region of the towing vehicle is determined.

12. The method according to claim 1, wherein detection points corresponding to a free space in the environmental region are additionally identified in the lidar sensor data based on the kinematic model of the trailer, objects in the environmental region are identified based on the detection points corresponding to the free space and it is examined whether the objects are within the updated blind spot region determined on the basis of the updated kinematic model of the trailer.

13. The method according to claim 12, wherein intensity values of the detection points corresponding with the free space are determined, the detection points are filtered by comparing the intensity values with a distance-based intensity threshold, the filtered detection points corresponding to the free space are grouped into clusters, and the objects are detected based on the clusters, wherein the respective detection points within a cluster are filtered by comparing the intensity values of the detection points within the cluster with a clusters-specific relative intensity threshold, the cluster-specific relative intensity threshold being determined as a function of the intensity values of the detection points of the cluster.

14. The method according to claim 12, wherein a spatial position of the identified objects relative to the kinematic model of the trailer is determined on the basis of the lidar sensor data, and a presence of an object in the blind spot region is detected if an overlapping region between the object and the blind spot region exceeds a predetermined threshold value for the overlapping region, wherein a warning signal is generated in case of a presence of an object in the blind spot region.

15. The method according to claim 14, wherein a time period of the presence of the object in the blind spot region is detected and the warning signal is generated only if the time period exceeds a predetermined threshold value for the time period.

16. The method according to claim 14, wherein a specific warning signal is generated for each blind spot region in the event that a blind spot region for the trailer, a blind spot region for the towing vehicle and a blind spot region for the vehicle/trailer combination are defined.

17. The method according to claim 1, wherein the lidar sensor device is arranged at a side region of the towing vehicle.

18. The method according to claim 1, wherein the blind spot region of the trailer is updated based on a length of the trailer and a tolerance length.

19. A blind spot system for a vehicle/trailer combination formed by a towing vehicle and a trailer, comprising:
- at least one lidar sensor device for positioning on the towing vehicle and for detecting lidar sensor data from an environmental region of the vehicle/trailer combination; and
- a control device for performing a method according to claim 1.

20. A vehicle/trailer combination comprising:
- a towing vehicle;
- a trailer coupled to the towing vehicle; and
- a blind spot system according to claim 19;
- wherein the towing vehicle includes a side mirror, and the at least one lidar sensor device is arranged at the side mirror.

* * * * *